UNITED STATES PATENT OFFICE.

MORRIS L. WEISS, OF BROOKLYN, NEW YORK, ASSIGNOR TO DOVAN CHEMICAL CORPORATION, OF WILMINGTON, DELAWARE, A CORPORATION OF DELAWARE.

VULCANIZATION ACCELERATOR.

1,411,231.   Specification of Letters Patent.   Patented Mar. 28, 1922.

No Drawing.   Application filed November 12, 1921. Serial No. 514,727.

*To all whom it may concern:*

Be it known that I, MORRIS L. WEISS, a citizen of the United States, residing in the borough of Brooklyn, county of Kings, city and State of New York, have invented certain new and useful Improvements in Vulcanization Accelerators, of which the following is a full, clear, concise, and exact description.

The object of my invention is to improve rubber compounds so that the finished product shall be of superior quality and so that the time required for vulcanization shall be greatly reduced over that ordinarily required for such purpose. It is known that when certain organic substances are added to the rubber mix during the compounding, a catalytic or similar action is produced which causes the rubber or similar gum to unite or react more rapidly and thoroughly with sulphur or other vulcanizing agents.

I have discovered that disubstituted guanidines particularly diphenylguanidine is particularly effective for this purpose. This substance is indicated by the formula

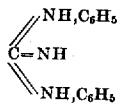

I am aware that disubstituted guanidines have been produced by laboratory methods and have been known to chemists for many years beginning about the year 1848 with the work of A. W. Hoffman (An. Chem. Parm. 67–129), but down to time of my researches in accelerators of this type, it was apparently not known that di-substituted guanidines were efficacious or useful as accelerators in vulcanizing, nor that this substance could be produced in sufficiently large quantities in a substantially pure form, or at a sufficiently low cost to be available for this purpose.

I am aware that triphenylguanidine has been suggested, and probably used to some extent, as an accelerator in the vulcanization of rubber, but the use of diphenylguanidine for that purpose appears to have been unknown prior to my researches on this substance.

I have found that diphenylguanidine is much more powerful and efficacious as an accelerator in vulcanization than triphenylguanidine. For example, in the vulcanization of hard rubber articles the use of diphenylguanidine not only hastens the vulcanizating action but results in a final product much superior in texture, strength, durability and aging qualities over that when the triphenylguanidine is used. A greatly improved product also results when diphenylguanidine is used as an accelerator in the vulcanization of soft rubber compounds, particularly as regards elasticity, aging qualities and freedom from "bloom." In these and similar instances, it has been found that the use of triphenylguanidine requires from two to three times as long a period in vulcanizing as when diphenylguanidine is used, particularly at lower heat or steam pressures than those commonly employed.

In my prior application Serial No. 482,143 filed July 2, 1921, I have described and claimed a process for producing and purifying diphenylguanidine in commercial quantities, and have therein given a résumé of the historical development of the methods of producing the same.

As set forth in said application, I, at present, prefer to produce my improved accelerator by desulphurizing thiocarbanilide by the action of a metallic oxide, such as lead oxide, zinc oxide, etc., in an alcoholic solution of an ammonium salt, such as ammonium nitrate.

The present patent application therefore relates to the vulcanization of rubber or similar substances, in which disubstituted guanidines are employed as the accelerating agent or catalyzer, and particularly diphenylguanidine.

The method of carrying out my invention, which I at present deem preferable, may be illustrated by the following example:

The rubber may be compounded in the following proportions: 50 parts by weight of new rubber, 45.5 parts by weight of zinc oxide, 3.5 parts by weight of sulphur, 1 part by weight of diphenylguanidine.

These are mixed together in any suitable way, such as by milling, and then vulcanized or cured in the usual molds or otherwise under heat corresponding to a steam pressure of about 40 lbs. per square inch. This vulcanizing temperature should be continued until the compound is suitably vulcanized, which requires from 10 to 20 minutes depending upon the shape and size of the articles being vulcanized.

It will therefore be appreciated that when using the accelerator according to my invention the vulcanization is accomplished by using comparatively small quantities of the accelerator, thereby obviating undesirable loading or adulteration of the rubber compound. Furthermore, by the use of such accelerator, the texture and durability of the final product is greatly improved and the tendency commonly present in vulcanized rubber to bloom and become brittle with age is greatly reduced if not entirely obviated. My improved accelerator is particularly useful and valuable where it is desired to produce a harder or less elastic portion in an article leaving other parts which are required to be more elastic and flexible, such as in automobile tires where the beadstock is usually made harder than the body or carcass of the tire proper. The relative amounts of vulcanizing agent and accelerator may be so proportioned that the various parts of a single article may be cured to different degrees of hardness without danger of over-curing the softer or more elastic parts. I have found moreover that diphenylguanidine does not need zinc oxide to shorten the time of cure. I however prefer to use zinc oxide on account of its effects on the physical properties of the product.

Having thus described this example of my invention and the method of using the same, I do not wish to be understood as being limited to the exact proportions, ingredients, temperatures, etc., indicated, for various changes may be made without departing from the essential features of my invention as set forth in the accompanying claims.

What I claim and desire to protect by Letters Patent is:

1. The process of treating rubber or similar materials, which comprises combining with the rubber compound a di-substituted guanidine.

2. The process of treating rubber or similar materials which comprises combining with rubber compound a di-substituted guanidine comprising two phenyl radicles or groups.

3. The process of treating rubber or similar materials which comprises combining with the rubber compound an accelerator derived from thiocarbanilide in which the sulphur is substituted by an imide group.

4. The process of treating rubber or similar materials which comprises combining with the rubber compound diphenylguanidine.

5. The process of treating rubber or similar materials which comprises combining with the rubber compound a vulcanizing agent and a di-substituted guanidine accelerator.

6. The process of treating rubber or similar materials which comprises combining with the rubber compound a vulcanizing agent and a di-substituted guanidine comprising two phenyl radicles or groups.

7. The process of treating rubber or similar materials which comprises combining with the rubber compound a vulcanizing agent and an accelerator derived from thiocarbanilide in which the sulphur is substituted by an imide group.

8. The process of treating rubber or similar materials, which comprises combining with the rubber compound a vulcanizing agent and diphenylguanidine.

9. A vulcanizing compound of rubber or similar material combined with a vulcanizing agent and a di-substituted guanidine.

10. A vulcanized compound of rubber or similar material combined with a vulcanizing agent and di-substituted guanidine comprising two phenyl radicles or groups.

11. A vulcanized compound of rubber or similar material combined with a vulcanizing agent and an accelerator derived from thiocarbanilide in which the sulphur is substituted by an imide group.

12. A vulcanized compound of rubber or similar material combined with a vulcanizing agent and diphenylguanidine.

Signed at New York, N. Y., November 10th, 1921.

MORRIS L. WEISS.

DISCLAIMER.

1,411,231.—*Morris L. Weiss*, Brooklyn, N. Y. VULCANIZATION ACCELERATOR. Patent dated March 28, 1922. Disclaimer filed August 9, 1927, by the assignee, *Dovan Chemical Corporation*, patentee assenting.

Hereby disclaims from the scope of any of the claims of said Letters Patent all di-substituted guanidines except the one shown in the illustrative formula of said patent, and except di-substituted guanidines wherein one or more of the hydrogen atoms of either or both of the phenyl ($C_6H_5$) groups in said illustrative formula may be substituted by a hydrocarbon radical.

[*Official Gazette August 30, 1927.*]